United States Patent
Hagidaira et al.

(10) Patent No.: US 6,498,403 B1
(45) Date of Patent: Dec. 24, 2002

(54) FAIL-SAFE MECHANISM HAVING A DRIVER CIRCUIT FOR CONTROLLING DRIVING OF AN ELECTRICAL SYSTEM OF A VEHICLE

(75) Inventors: Shinichi Hagidaira, Kani (JP); Norimasa Amano, Sagamihara (JP); Kazuhiro Sasaki, Kamo-gun (JP)

(73) Assignees: Kayaba Industry Co., Ltd., Tokyo (JP); Hino Motors, Ltd., Tokyo (JP)

( * ) Notice: Subject to any disclaimer, the term of this patent is extended or adjusted under 35 U.S.C. 154(b) by 17 days.

(21) Appl. No.: 09/654,552

(22) Filed: Sep. 1, 2000

(30) Foreign Application Priority Data

Sep. 3, 1999  (JP) .............................. 11-250738
Oct. 26, 1999  (JP) .............................. 11-303204

(51) Int. Cl.$^7$ .................................................. B60L 1/00
(52) U.S. Cl. ...................................... 307/9.1; 307/10.1
(58) Field of Search ................................ 307/9.1, 10.1; 303/122, 122.02–122.06; 123/339.14, 339.15, 339.19

(56) References Cited

U.S. PATENT DOCUMENTS

| | | | | |
|---|---|---|---|---|
| 4,562,528 A | * | 12/1985 | Baba .............................. 700/4 |
| 4,979,066 A | * | 12/1990 | Tanaka et al. ............... 257/347 |
| 5,190,009 A | * | 3/1993 | Kadota ................... 123/339.14 |
| 5,192,873 A | * | 3/1993 | Wrenbeck et al. .......... 307/10.1 |
| 5,897,596 A | * | 4/1999 | Kabune et al. ......... 303/122.04 |
| 5,924,776 A | * | 7/1999 | Kimura et al. ......... 303/122.05 |

\* cited by examiner

Primary Examiner—Stephen W. Jackson
Assistant Examiner—Sharon Polk
(74) Attorney, Agent, or Firm—Steinberg & Raskin, P.C.

(57) ABSTRACT

The invention relates to a device that interrupts electric power to a driving circuit when a system failure is detected. A fail-safe mechanism is provided with a main switch circuit connected between a driving power source and a driver circuit; a sub switch circuit connected between the driving power source and the main switch circuit, and maintaining an OFF state in normal times; a timer circuit allowing the sub switch circuit for a predetermined time period after the driving power source is turned on; a failure detector circuit connected between the main switch circuit and a controller; and a sub switch control means bringing the sub switch circuit to an OFF state when the feeding of electric current is cut off. The main switch circuit is turned OFF when the failure detector circuit detects an abnormal condition of the controller.

3 Claims, 5 Drawing Sheets

FAIL-SAFE MECHANISM HAVING A DRIVER CIRCUIT FOR CONTROLLING DRIVING OF AN ELECTRICAL SYSTEM OF A VEHICLE

BACKGROUND OF THE INVENTION

1. Field of the Invention

This invention relates to a fail-safe mechanism for stopping electrical systems, e.g. a rear-wheel steering gear, mounted in a vehicle to counter a failure occurring in the electrical system.

2. Description of Related Art

Regarding the control of driving motors of rear-wheel steering gears and hydraulic type control valves, a system is typically stopped upon occurrence of a failure. However, for safety of the vehicle, the system must sometimes not be recovered during the vehicle's travel. In this event, CPU is provided with a self-diagnostic circuit to check whether or not the above control program operates normally. When the self-diagnostic circuit detects an abnormal condition in the control program, the CPU outputs a failure signal to turn off a switch provided between a driver circuit and a driving power source. The switch is designed to remain connected whenever it does not receive the failure signal from the CPU, and to disconnect upon receiving the failure signal.

A plural of CPUs are provided for determining whether or not CPU normally controls the driving of the motor of rear-wheel steering gears or the hydraulic type control valves if operation of a CPU differs from that of other CPUS, the differently operating CPU is determined to be abnormal and is stopped from controlling.

As explained above, in the event that the self-diagnostic circuit detects an error and the switch between the driving power source and the driver circuit is turned off, if the failure signal is not outputted by any reason, the switch turns on to re-feed electric power to the drive circuit. Alternatively, although the control program is corrupted, the failure signals are interrupted, and signals may be outputted as if the control program operates normally.

If such events are repeated, the control is alternately valid and invalid during travelling. This may result in unstable conditions of the running vehicle. Moreover, repeating of ON and OFF of the driving signal may cause the failures of the control mechanism or systems to be controlled.

On the other hand, if stopping the CPU due to the detection of abnormality leads to stopping the rear-wheel steering gears or the like, a variety of difficulties may often be produced.

SUMMARY OF THE INVENTION

It is an object of the present invention to provide a fail-safe mechanism that cuts off the electric-power supplies to a driver circuit to reliably stop a system when detecting a failure in the system, and not allowing the electric power to be supplied to the driver circuit unless a driving power source is restarted.

It is another object of the present invention to provide a fail-safe mechanism that detects an abnormality of a control system by its own CPU rather than other CPUs, and allows a standby control system to automatically continues the control for apparatus after the control system is stopped due to the abnormality.

A feature in accordance with a first aspect of the present invention, a fail-safe mechanism includes: a driver circuit for controlling driving of an electrical system of a vehicle; a controller controlling the driver circuit in accordance with a control program; a driving power source feeding electric current to the driver circuit; a main switch circuit connected between the driving power source and the driver circuit; a sub switch circuit connected between the driving power source and the main switch circuit to control the ON/OFF switching of power source applied from the driving power source to the main switch circuit, and maintaining an OFF state in normal times; a timer circuit allowing the sub switch circuit to be fed with electric current for a predetermined time period after the driving power source is turned on; a failure detector circuit connected between the main switch circuit and the controller; and a sub switch control means provided in shunt with the driver circuit downstream from the main switch circuit, and bringing the sub switch circuit to an ON state due to the feeding of electric current to the driver circuit, and the sub switch circuit to an OFF state when the feeding of electric current to the driver circuit is cut off. The fail-safe mechanism is further characterized in that when the failure detector circuit detects an abnormal condition of the controller, the main switch circuit is turned OFF to interrupt the electric current passing from the driving power source to the driver circuit.

Predicated on the first aspect, a feature in accordance with a second aspect of the present invention is that the sub switch circuit includes a first switch and a second switch connected in parallel, the first switch being controlled by the timer circuit, the second switch controlled by the sub switch control means.

Predicated on the above aspect, a feature in accordance with a third aspect of the present invention is that the fail detector circuit includes a plurality of watchdog timers and an AND circuit, each of the watchdog timers receiving a failure detection signal outputting from each control program, the AND circuit receiving an output signal from the each watchdog timer and sending the output signal to the main switch circuit.

According to the first to third aspects, when the abnormal condition occurs in the system driving-controlled by the CPU, the feeding of the driving power source to the driver circuit is stopped to stop the system, and moreover the electric current is not fed to the driver circuit unless the driving power source is restarted. Accordingly, it is reliably prevented that, for example, the system recovers during the vehicle's travel.

According to the third aspect, particularly, the abnormalities of a plurality of control programs are individually detected, and if only one abnormality of them is detected, the system can be stopped, resulting in further reliable prevention of malfunctions of the system.

A feature in accordance with a fourth aspect of the present invention is that a fail-safe mechanism includes first and second control systems controlling driving of an electrical system of a vehicle, and each of the first and second control system includes: a driver circuit connected with the electrical system of the vehicle; a CPU controlling the driver circuit; a driving power source feeding electric current to the driver circuit; a switch circuit connected between the driving power source and the driver circuit; and a CPU failure-detecting feature connected between the switch circuit and the driver circuit, and detecting an abnormal condition of the CPU from an output signal sent from the CPU, wherein when the CPU of one of the first and second control systems outputs a failure signal during the operation of the one control system, the CPU failure-detecting feature of the one control system outputs an instruction for turning off to the switch circuit of the one control system, and the one control system sends a signal, representing the stopping of the feeding of electric current to the driver circuit, to the CPU of the other control system to allow the other control receiving the signal to start the driving-control.

According to the fourth aspect, the two control systems are provided. When one control system is stopped, the other control system operates to continue the control operation. In addition, it is possible to detect the abnormality occurring in the one control system without using the CPU of the other control system.

When the abnormal condition occurs, the feeding of the driving power source to the driver circuit is stopped to stop the system, and moreover the electric current is not fed to the driver circuit unless the driving power source is re-turned on. Accordingly, it is reliably prevented that, for example, the system recovers during travelling of the vehicle.

In addition, it unnecessary to employ a conventional logic based on majority rule using more than three CPU, resulting in the simple and low cost system configuration.

Predicated on the fourth aspect, a feature in accordance with a fifth aspect of the present invention is that the CPU failure-detecting feature includes a plurality of watchdog timers and an AND circuit, each of the watchdog timers receiving a failure detection signal outputting from each control program in the CPU, the AND circuit receiving an output signal from the each watchdog timer and sending the output signal to the switch circuit.

According to the fifth aspect, the abnormalities of a plurality of control programs are individually detected, and if only one abnormality of them is detected, the system can be stopped, resulting in further reliable prevention of malfunctions of the system.

DETAILED DESCRIPTION OF THE PREFERRED EMBODIMENTS

Figure 1:
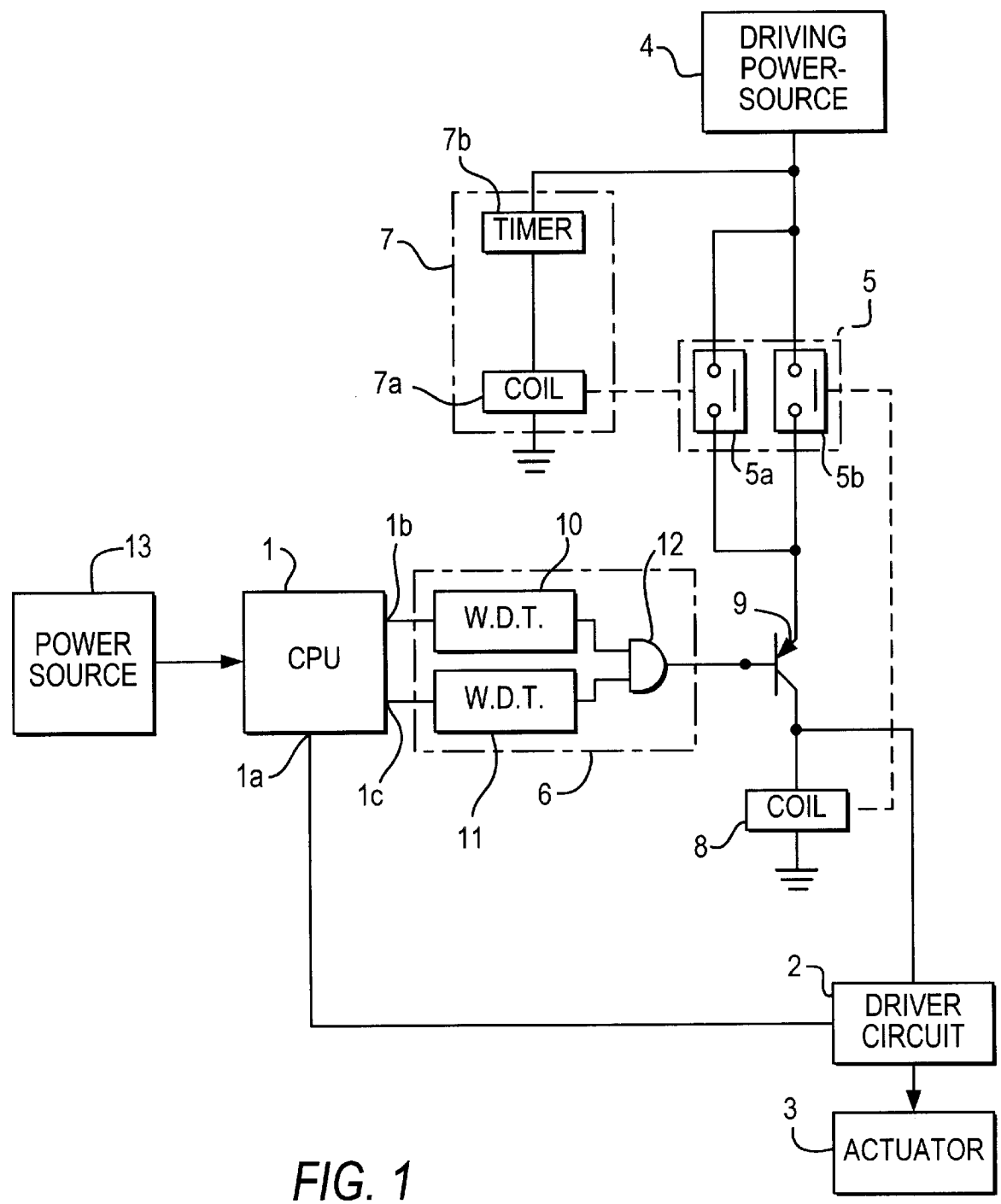
FIG. 1 is a schematic circuit diagram of a first embodiment.

A first embodiment illustrated in FIG. 1 is a circuit for controlling a system of a vehicle, such as a rear-wheel steering gear, which has a fail-safe mechanism according to the present invention.

CPU 1 as a controller is connected to a driver circuit 2 at its port 1a, and controls an actuator 3 through the driver circuit 2. The actuator 3 is a valve unit of the not shown rear-wheel steering gear.

The driver circuit 2 is connected to a driving power source 4 through a transistor 9 as a main switch circuit of the present invention.

A sub-switch circuit 5 connects between the transistor 9 and the driving power source 4, and comprises first and second switches 5a, 5b which are connected in parallel.

The first switch 5a is controlled by a timer circuit 7 connected to the driving power source 4. The timer circuit 7 comprises a coil 7a and a timer switch 7b. Upon setting the driving power source 4 to the ON position, the timer switch 7b operates to feed electric current to the coil 7a for a predetermined time period. Upon excitation of the coil 7a, the first switch 5a is closed.

The second switch 5b is closed when the coil 8 is energized. The transistor 9 connects between the coil 8 and the second switch 5b. In short, the coil 8 is sub switch control means of the present invention.

When the first switch 5a or second switch 5b is closed at the same time the transistor 9 is applied with a moderate base current, the above circuit is closed to establish connection between the above driving power source 4 and the driver circuit 2.

On the other hand, ports 1b, 1c of the CPU 1 are connected to a failure detector circuit 6, and the failure detector circuit 6 is connected to the above transistor 9.

The CPU 1 outputs failure detection signals from the respective ports 1b, 1c. Specifically, the failure detector circuit 6 is a circuit for detecting a failure of the CPU 1 based on the above failure detection signal, and inputting a failure signal to the main switch circuit. Incidentally, reference numeral 13 in the drawing indicates a power source for the CPU The failure detector circuit 6 is provided with watchdog timers 10, 11 respectively connected to the ports 1b, 1c of the CPU 1, and an AND circuit 12 summing outputs from the watchdog timers 10, 11. Each of the watchdog timers 10, 11 receives a pulse signal from the CPU 1. The pulse signal is continuously applied during the normal operation of the control program. Each of the watchdog timers 10, 11 outputs an H signal, having predetermined amperage, whenever receiving the pulse signal, whereas if the inputting of the pulse signal is stopped for a predetermined time period, each of the watchdog timers 10, 11 output an L signal having amperage lower than that of the H signal.

It should be mentioned that the watchdog timers 10, 11 are respectively applied with the pulse signals outputted from respective control programs. The pulse signal is a failure detection signal of the present invention.

Only when both the watchdog timers 10, 11 output the H signals, the AND circuit 12 connected to the watchdog timers 10, 11 outputs a signal. Otherwise the AND circuit 12 does not output any signal. In other words, while both the control programs normally operate to apply the pulse signals to the respective watchdog timers 10, 11, the AND circuit 12 operates to feed electric current. The power current results in the base current for the above transistor 9, which allows electric current to pass from the driving power source 4 to the transistor 9.

However, if abnormality occurs in any one of the control programs, then a watchdog timer having detected the abnormality outputs the L signal, so that the AND circuit 12 does not output the signal. No signal output is identical to output of a zero signal. In other words, the base current to the transistor 9 is cut off.

Figure 2:
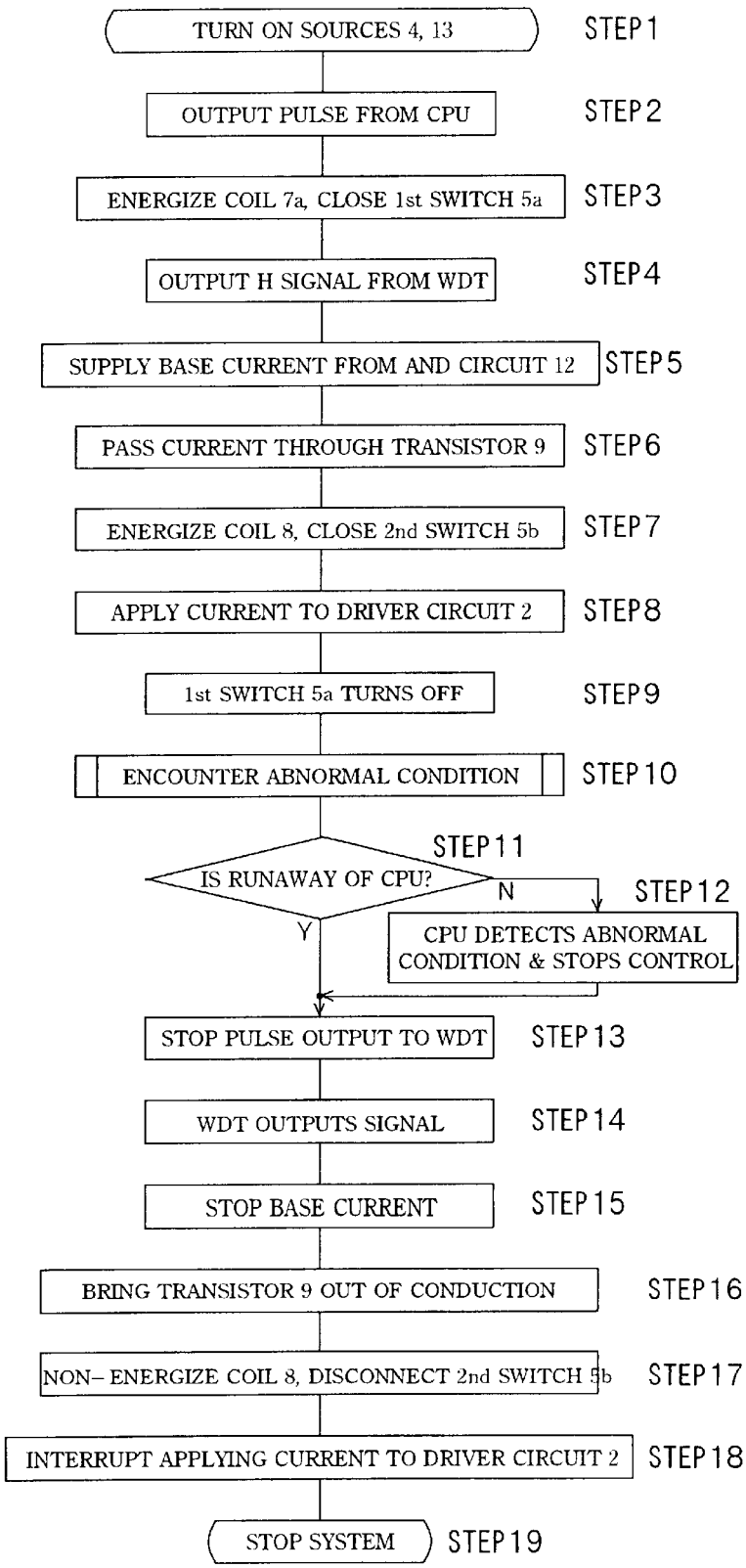
FIG. 2 is a flow chart of the first embodiment.

Next, operation of the control circuit of FIG. 1 will be explained with reference to the flow chart of FIG. 2. Note that the flow chart is for explaining the entire operation of the aforementioned control circuit, and not for explaining the steps of the control program of CPU 1. Reference characters "W.D.T." in FIG. 2 represents the watchdog timer.

At step 1, the driving power source 4 and the power source 13 are turned on. Upon turning on the power source 13, the control programs in CPU 1 start up. If they operate normally, the CPU 1 applies the pulse signals to the watchdog timers (WDT) 10, 11 at step 2.

Also, upon turning on the driving power source 4, at step 3, the coil 7a of the timer circuit 7 is energized, and the first switch 5a is closed. This establishes an electrical connection from the driving power source 4 to the transistor 9.

On the other hand, at step 4, the H signals are sent from both the watchdog timers (WDT) 10, 11 to the AND circuit 12 because the watchdog timers 10, 11 receive the pulse signals. Accordingly, the AND circuit 12 operates to supply the base current to the transistor 9 of the main switch circuit at step 5. At step 6, thus, the electric current passes through the transistor 9 so as to pass through the coil 8.

At step 7, the coil 8 is energized to close the second switch 5b. This allows electric current to pass to the driver circuit 2 (step 8). In short, the electric current travels from the driving power source 4 to the second switch 5b, then to the transistor 9, then to the coil 8 and driver circuit 2, and finally to the actuator 3 to operate the system (not shown). At this time, the CPU 1 sends a control signal according to the control program to the driver circuit 2.

Since the power source is fed from the driving power source 4 through the second switch 5b and the transistor 9 to the driver circuit 2 as explained above, even when the timer 7b turns off the first switch 5a after the expiration of a predetermined time interval (step 9), the power feeding path is secured. Accordingly, the system (not shown) connected to the actuator 3 continues its operation.

At step 10, some abnormal condition is encountered somewhere in the system. Response of the fail-safe mechanism varies depending upon whether the abnormality is produced by a runaway of the CPU or other causes.

When the runaway of the CPU 1 is determined to be the cause at step 11, the process proceeds to step 13. When something other than the CPU 1 is the cause, the process proceeds to step 12.

If the CPU 1 is in a normal condition, the CPU 1 can detects the abnormality of the system. Upon the detection of the abnormality, the CPU 1 voluntarily stops its control operation at step 12, and stops sending the pulse signals to the watchdog timers 10 and 11 at step 13. At step 14, the watchdog timers 10, 11 output the L signals to cause the AND circuit 12 to stop outputting of the signals. At step 15, therefore, the feeding of the base current to the transistor 9 is stopped.

At step 16, no base current stops the conduction of transistor 9. At step 17, the coil 8 results in a non-energized state to turn off the second switch 5b. At step 18, the feeding of electric current to the driver circuit 2 is therefore stopped to stop the system (step 19).

If the step 11 determines that the CPU 1 causes the abnormality of the system, the process proceeds to step 13. Although the CPU 1 cannot detect the abnormality, the pulse signals are not sent to the watchdog timers 10, 11 because the control programs do not operate normally (step 13).

After that, as in the above case when the cause of the abnormality is not the CPU, the process goes through steps 14 to 18, and the system stops at step 19. According to the first embodiment, as described above, if abnormality occurs, the electrical connection between the driver circuit 2 and the driving power source 4 driving the driver circuit 2 is interrupted to stop the system which is controlled by the CPU 1, resulting in reliable prevention of malfunctions.

Moreover, the failure detector circuit 6 outputs the signal to stop feeding the base current to the transistor 9. Therefore, once the transistor 9 disconnects, the process proceeds back to step 1, and the disconnected main switch circuit does not connect unless the driving power source 4 is set manually to the ON position. In the event that the pulse signal is accidentally outputted—even though the control program of the CPU 1 is under a runaway, and the base current is fed to the transistor 9, the power source is not fed to the driver circuit 2 due to the disconnection between the driving power source 4 and the transistor 9. As a matter of course, even after the control program of the CPU 1 recovers, the sub switch 5 is not connected of its own accord.

In consequence, in the event of an error, the system is immediately stopped but does not recover on its own.

In the first embodiment, the failure detector circuit 6 is provided with the two watchdog timers 10, 11 which are designed to respectively receive the pulse signals from the respective control programs. The watchdog timers 10, 11 apply the output signals to the AND circuit 12. Thus, if any one of the two control programs abnormally operates, it is possible to stop the feeding of the base current to the transistor 9 to turn off the main switch circuit.

The number of control programs is not limited to two, but may be one or more than three. The number of watchdog timers can be increased in accordance with the number of control programs such that each watchdog timer keeps watch on each control program. This develops the accuracy of the failure detection.

Also, the configuration of the failure detector circuit 6, main switch circuit, sub switch circuit and sub-switch control means is not limited to that in the first embodiment.

In short, it is only requested that the failure detector circuit 6 outputs the failure signal when receiving the signal representing the abnormality of the control program from the CPU 1, to turn off the main switch circuit, and the sub switch circuit is turned off by turning off the main switch circuit, and also they do not recover by themselves.

Figure 3:
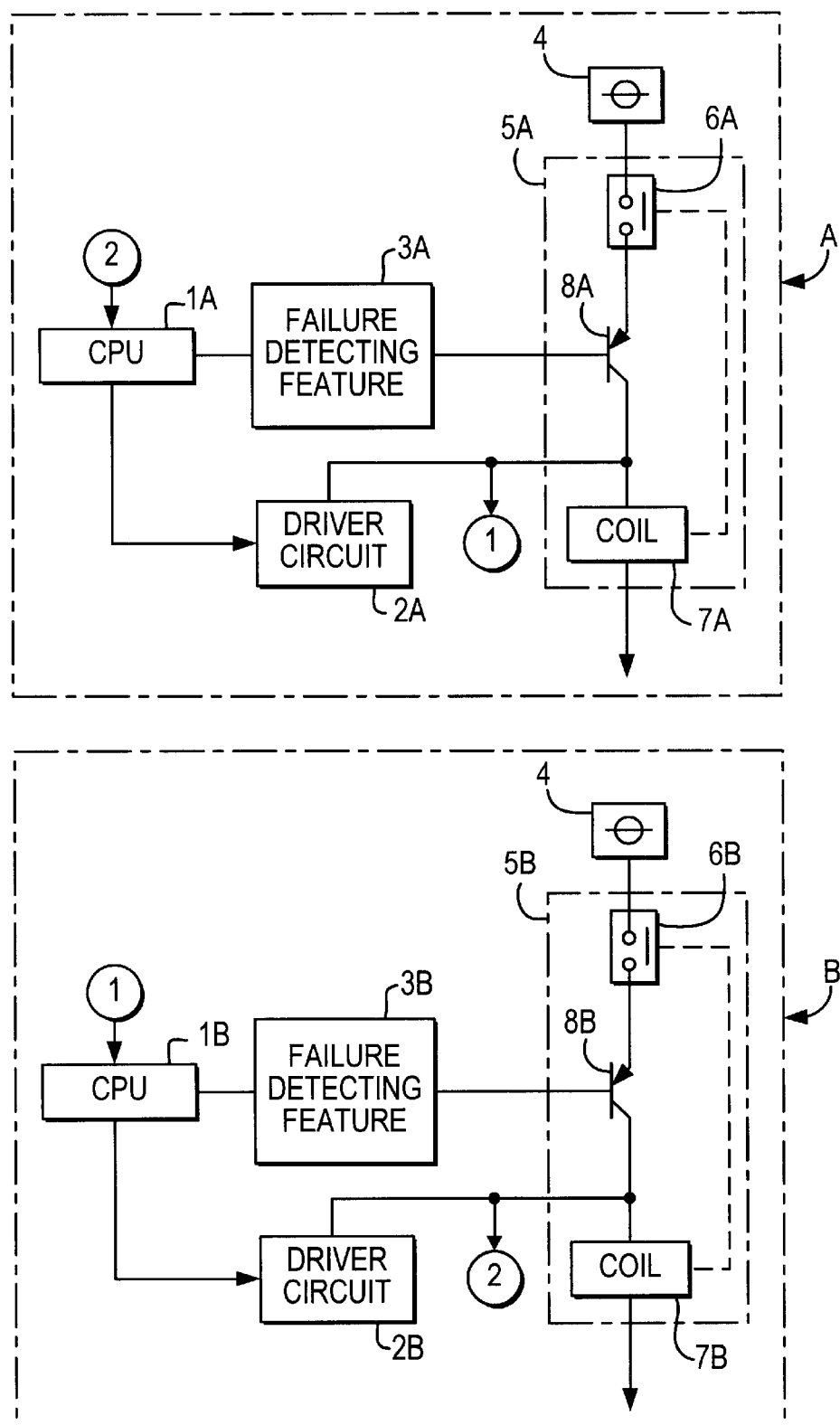
FIG. 3 is a schematic control circuit diagram of a second embodiment.

A second embodiment illustrated in FIGS. 1 and 3 is a control circuit for controlling, for example, a rear-wheel steering gear of the vehicle, which has a fail-safe mechanism according to the present invention.

The control circuit comprises two control systems A and B having the same configuration.

In the control system A, CPU 1A is connected to a driver circuit 2A to driving-control a valve unit of the rear-wheel steering gear (not shown) through the driver circuit 2A.

The driver circuit 2A is connected to a driving power source 4 through a switch circuit 5A according to the present invention.

The switch circuit 5A is composed of a contact 6A, a coil 7A and a transistor 8A connected between the contact 6A and the coil 7A. The contact 6A closes when the coil 7A is energized. Such switch circuit 5A is designed to close while the coil 7A is energized and when an appropriate base current is passed through the transistor 8A, which establish a connection between the driving power source 4 and the driver circuit 2A to feed electric current to the driver circuit 2A.

It should be mentioned that a switch mechanism for energizing the coil 7A to turn on the contact 6A is not shown in the drawing. The switch mechanism is a mechanism such as a timer relay maintaining the coil 7A in an energized state for a predetermined time interval when an power source is turned on manually.

The CPU 1A is connected to a failure-detecting feature 3A which is connected to a base of the transistor 8A.

The CPU 1A sends a pulse signal to the failure-detecting feature 3A. The pulse signal is continuously outputted during the normal operation of a control program of the CPU 1A. The failure-detecting feature 3A outputs an H signal of a predetermined voltage while receiving the pulse signal. The H signal results in a base voltage for the transistor 8A, which allows electric current to pass from the driving power source 4 to the transistor 8A.

On the other hand, the failure-detecting feature 3A outputs an L signal of a voltage lower than that of the H signal when it does not receive the pulse signal for a predetermined time interval. The voltage of the L signal is insufficient as the base voltage for the transistor 8A.

In other words, the stopping of the pulse signal corresponds to an abnormal signal of the present invention.

Since the failure-detecting feature 3A outputs the L signal unless the pulse is supplied from the CPU 1A, the electric current is interrupted between a collector and an emitter in the transistor 8A. Accordingly, the switch circuit 5A turns off to stop feeding the electric current to the driver circuit 2A.

The control system B has the same configuration as that of the above control system A, so that the same components as those of the control system A are indicated with reference character "B" instead of "A" used for the control system A, and the description is omitted.

A signal line is connected from between the switch circuit 5A and the driver circuit 2A in the control system A to CPU 1B of the control system B, for sending a signal representing whether or not the driving power source is fed to the driver circuit 2A. This configuration is the same in the control system B.

Next, operation of the control circuit in FIG. 3 will be explained with reference to the flow chart in FIG. 4. The operation explanation in the second embodiment starts from the state in which the control system A first operates to driving-control the rear-wheel steering gear (not shown). Incidentally, the flow chart is for explaining the operation of the above entire control circuit, not for explaining the steps of the control program of the CPU 1A.

At step 101, the driving power source 4 and power sources (not shown) of the CPU 1A and CPU 1B are turned on, and the switch mechanism (not shown) closes each of the switch circuits 5A, 5B. The control programs of the CPU 1A, 1B start up and normally operate to control the rear-wheel steering gear through the driving circuits 2A, 2B.

At this time, the CPU 1B also operates normally, while it detects, from the signal sent from the control system A, that the control system A controls the rear-wheel steering gear. Thus, in the control system B, while the transistor 8B is being turned on, the output instruction for outputting to the driver circuit 2A is suspended.

If an abnormal condition occurs at step 102, the process proceeds to step 103. If abnormality of the CPU 1A does not causes the abnormal condition, the CPU 1A can detects the abnormality at step 104.

At step 105, the CPU 1A applies the abnormal signal to the failure-detecting feature 3A, and the process proceeds to step 107.

At step 107, the failure-detecting feature 3A having received the abnormal signal outputs the L signal to interrupt the base current of the transistor 8A, resulting in turning off the transistor 8A.

On the other hand, if the abnormality occurs in the control program of the CPU 1A at step 103, outputting the pulse signal is stopped, so that the failure-detecting feature 3A detects abnormality at step 106.

The transistor 8A is turned off at step 107 and, at step 108, the coil 7A results in a no-energized state to open the contact 6A. In short, the switch circuit 5A is interrupted.

At step 109, feeding of the power source to the driving circuit 2A is cut.

At step 110, a signal representing that the control system A stops is sent to the CPU 1B of the control system B.

At step 111, the CPU 1B starts controlling the rear-wheel steering gear through the driver circuit 2B.

After that, as in the events of the steps 101 to 109, the driving control is continued until an abnormal condition is detected in the control system B.

However, if the control system B detects the abnormal condition, the control system A does not recover and all the control systems stop.

Figure 4:
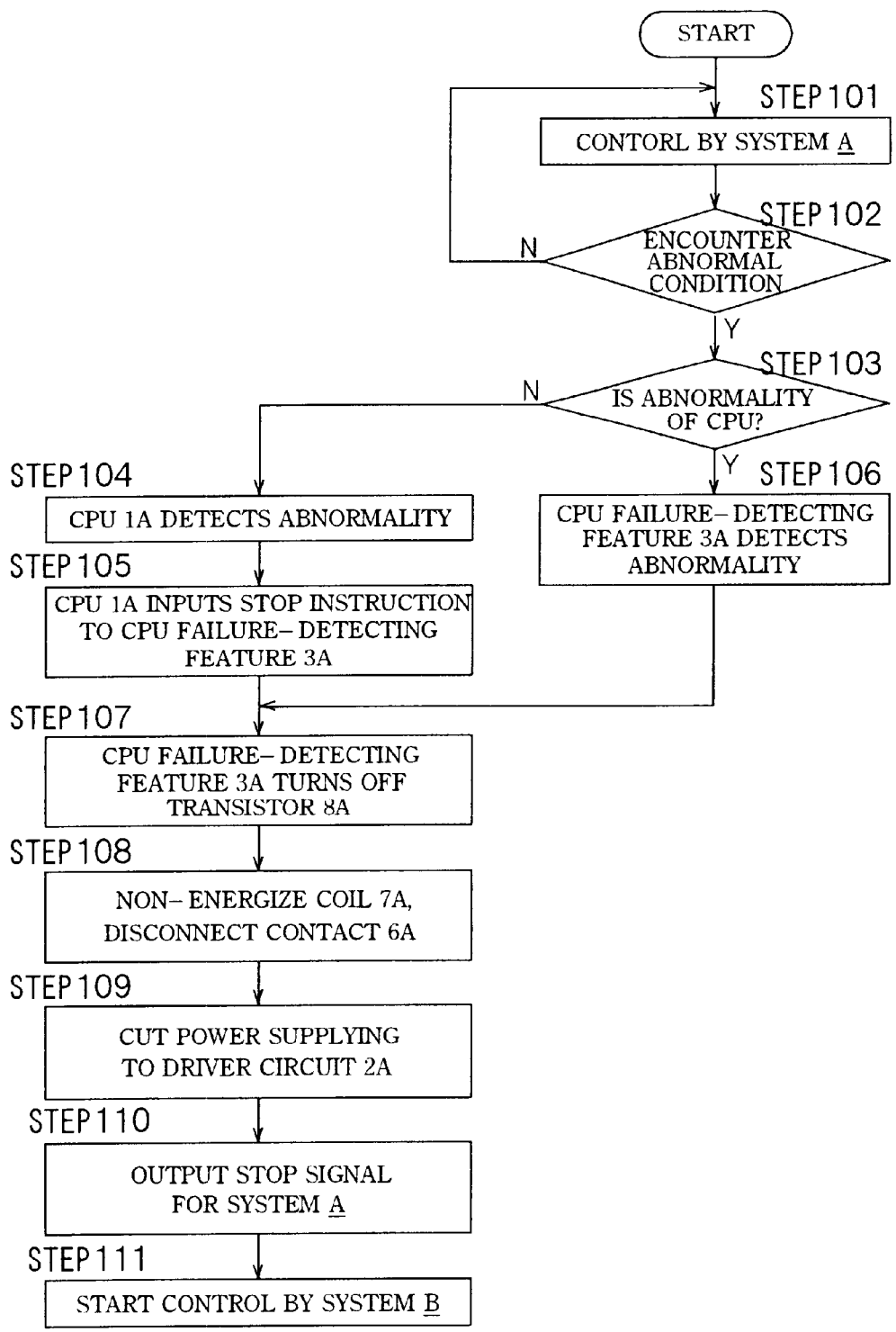
FIG. 4 is a flow chart of the second embodiment when abnormality is detected.

If the control system B is the first to control the system, it goes through a series of the aforementioned steps using reference character "B" in place of reference character "A" of the flow chart in FIG. 4. When the control system B stops due to the abnormality, the control system A starts controlling.

As described above, each control system can detect the abnormality therein irrespective of the other control system. In the event of detection of abnormality, the one control system provides an instruction to the other control system to continue controlling the apparatus such as the rear-wheel steering gear.

In the foregoing second embodiment, when an abnormal condition occurs, the electrical connection between the driver circuit 2A and the driving power source 4 for driving the driver circuit 2A is interrupted to stop the control system A which is controlled by the CPU 1A, resulting in reliable prevention of malfunctions. It is not designed that the control system A having stopped by occurrence of error recovers by itself.

Figure 5:
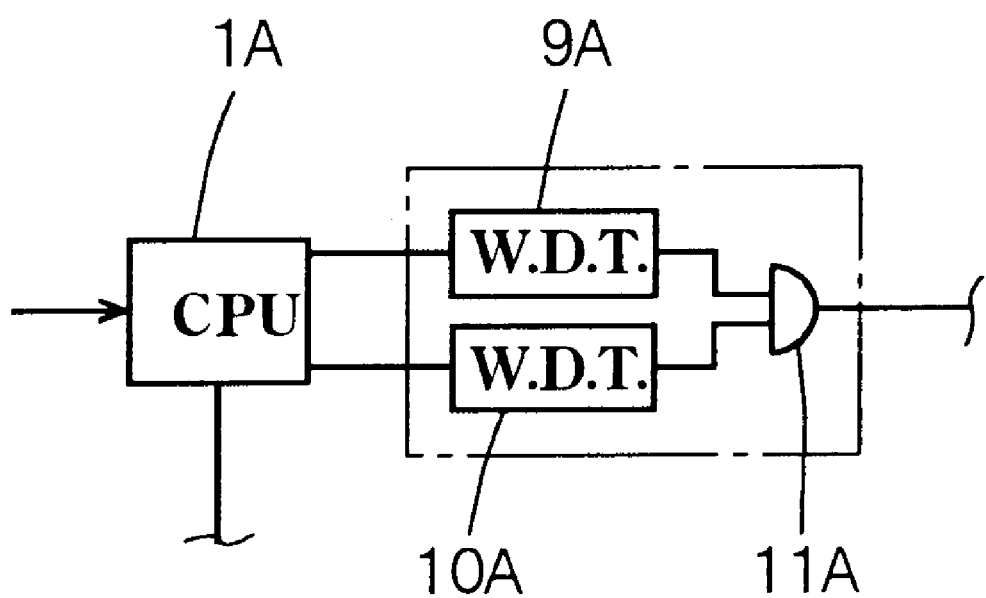
FIG. 5 is a schematic circuit diagram of a failure-detecting feature according to a third embodiment.

A third embodiment illustrated in FIG. 5 employs two watchdog timers 9A, 10A and an AND circuit 11A as the failure-detecting feature 3A, and other components are the same as those in the second embodiment.

Pulse signals are continuously applied to the respective watchdog timers 9A, 10A during the normal operations of the control programs of the CPU 1A. During reception of the pulse signal, each of the watchdog timers 9A, 10A outputs an H signal of a predetermined voltage. When the pulse signal is not applied for a predetermined time interval, each watchdog timer outputs an L signal of a voltage lower than that of the H signal.

The pulse signals are outputted from the different control programs and respectively sent from separated ports to the watchdog timers 9A, 10A.

The AND circuit 11A connected to the watchdog timers 9A, 10A outputs a signal only whenever it receives the H signals from both the watchdog timers 9A, 10A. Otherwise there is no output. In other words, when both the control program applying the pulse signals to the watchdog timers 9A, 10A operate normally, the AND circuit 11A does not output the H signal. This H signal results in the base voltage for the transistor 8A, allowing electric current to pass from the driving power source 4 to the transistor 8A.

However, if any one of the control programs fails, the watchdog timer having detected the abnormality outputs the L signal, so that the AND circuit 11A does not output the H signal. This represents that the base voltage for the transistor 8A is interrupted.

The third embodiment uses the two watchdog timers. However, the more than two watchdog timers may be used to keep watch on the respective control programs. In this event, the detection of the abnormality is achieved with greater accuracy.

The configurations of the failure-detecting feature 3A and the switch circuit 5A are not limited to those in the above embodiments.

It is only requested that the failure-detecting feature 3A can close the switch circuit 5A and send a signal to the control system B when receiving the signal representing the abnormal condition of the control program(s) from the CPU 1A. And also, the control system A does not recover by itself and the control system B continues controlling operation following the control system A.

What is claimed is:

1. A fail-safe mechanism comprising:
   a driver circuit for controlling driving of an electrical system of a vehicle;
   a controller controlling said driver circuit in accordance with a control program;
   a driving power source feeding electric current to said driver circuit;
   a main switch circuit connected between said driving power source and said driver circuit;
   a sub switch circuit connected between said driving power source and said main switch circuit to control the ON/OFF switching of power source applied from said driving power source to said main switch circuit, and maintaining an OFF state in normal times;
   a timer circuit allowing said sub switch circuit to be fed with electric current for a predetermined time period after said driving power source is turned on;
   a failure detector circuit connected between said main switch circuit and said controller; and
   a sub switch control means provided in shunt with said driver circuit downstream from said main switch circuit, and bringing the sub switch circuit to an ON state due to the feeding of electric current to said driver circuit, and the sub switch circuit to an OFF state when the feeding of electric current to said driver circuit is cut off,
   when the failure detector circuit detects an abnormal condition of the controller, said main switch circuit being turned OFF to interrupt the electric current passing from said driving power source to said driver circuit; and
   wherein said sub switch circuit includes a first switch and a second switch connected in parallel, said first switch being controlled by said timer circuit, said second switch being controlled by said sub switch control means.

2. A fail-safe mechanism comprising:
   a driver circuit for controlling driving of an electrical system of a vehicle;
   a controller controlling said driver circuit in accordance with a control program;
   a driving power source feeding electric current to said driver circuit;
   a main switch circuit connected between said driving power source and said driver circuit;
   a sub switch circuit connected between said driving power source and said main switch circuit to control the ON/OFF switching of power source applied from said driving power source to said main switch circuit, and maintaining an OFF state in normal times;
   a timer circuit allowing said sub switch circuit to be fed with electric current for a predetermined time period after said driving power source is turned on;
   a failure detector circuit connected between said main switch circuit and said controller; and
   a sub switch control means provided in shunt with said driver circuit downstream from said main switch circuit, and bringing the sub switch circuit to an ON state due to the feeding of electric current to said driver circuit, and the sub switch circuit to an OFF state when the feeding of electric current to said driver circuit is cut off;
   when the failure detector circuit detects an abnormal condition of the controller, said main switch circuit being turned OFF to interrupt the electric current passing from said driving power source to said driver circuit; and
   wherein said failure detector circuit includes a plurality of watchdog timers and an AND circuit, each of said watchdog timers receiving a failure detection signal outputting from each control program, said AND circuit receiving and output signal from said each watchdog timer and sending the output signal to said main switch circuit.

3. A fail-safe mechanism comprising:
   a first and a second control systems controlling driving of an electrical system of a vehicle, and each of said first and second control systems includes a driver circuit connected with the electrical system of the vehicle;
   a CPU controlling said driver circuit;
   a driving power source feeding electric current to said driver circuit;
   a switch circuit connected between said driving power source and said driver circuit;
   a CPU failure-detecting feature connected between said switch circuit and said driver circuit and detecting an abnormal condition of said CPU from an output signal sent from said CPU, wherein when said CPU of one said first and second control system outputs a failure signal during the operation of said one control system, said CPU failure-detecting feature of said one control system outputs an instruction for turning off to said switch circuit of said one control system, and said one control system sends a signal, representing the stopping of the feeding of electric current to said driver circuit, to said CPU of the other control system to allow said other control receiving the signal to start the driving-control; and
   wherein said CPU failure-detecting feature includes a plurality of watchdog timers and an AND circuit, each of said watchdog timers receiving a failure detection signal outputting from each control program in said CPU, said AND circuit receiving an output signal from said each watchdog timer and sending the output signal to said switch circuit.

* * * * *